United States Patent
Yoshida et al.

(10) Patent No.: US 6,243,228 B1
(45) Date of Patent: Jun. 5, 2001

(54) INFORMATION STORAGE AND RETRIEVAL DEVICE

(75) Inventors: Takeshi Yoshida, Odawara; Hiroshi Nishida, Naka-gun; Kenji Tomida, Odawara; Shozo Saegusa, Niihari-gun, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/028,953

(22) Filed: Feb. 24, 1998

(30) Foreign Application Priority Data

Feb. 27, 1997 (JP) .................................................. 9-043298
Nov. 13, 1997 (JP) .................................................. 9-312102

(51) Int. Cl.⁷ ............................ G11B 33/14; G11B 33/08
(52) U.S. Cl. ........................................................... 360/97.02
(58) Field of Search .............................. 360/97.01, 97.02

(56) References Cited

U.S. PATENT DOCUMENTS 5,546,250 * 8/1996 Diel ................................... 360/97.02
5,677,813 * 10/1997 Yoshida et al. .................. 360/97.02

FOREIGN PATENT DOCUMENTS

| 10311495 | 12/1989 | (JP) . |
| 4-368690 | 12/1992 | (JP) . |
| 6-96532 | 4/1994 | (JP) . |

* cited by examiner

*Primary Examiner*—George J. Letscher
(74) *Attorney, Agent, or Firm*—Mattingly, Stanger & Malur

(57) ABSTRACT

Shock-absorbing material made from a mixture of solid particles and viscous elastic material is arranged at the periphery of an information storage and retrieval device. When an external shock is applied to the device, the shock-absorbing material is greatly deformed and dissipates the shock energy by inner friction sufficiently to prevent damage to the inner mechanism of the device. The deformed shock-absorbing material can be restored to the original shape so that it is repeatedly usable. Furthermore, by comparing the deformed shape and the quick reference table provided with the device, the amount shock acceleration can be roughly determined. The device conforms to one of a series of dimensional standards for information storage and retrieval devices.

14 Claims, 12 Drawing Sheets

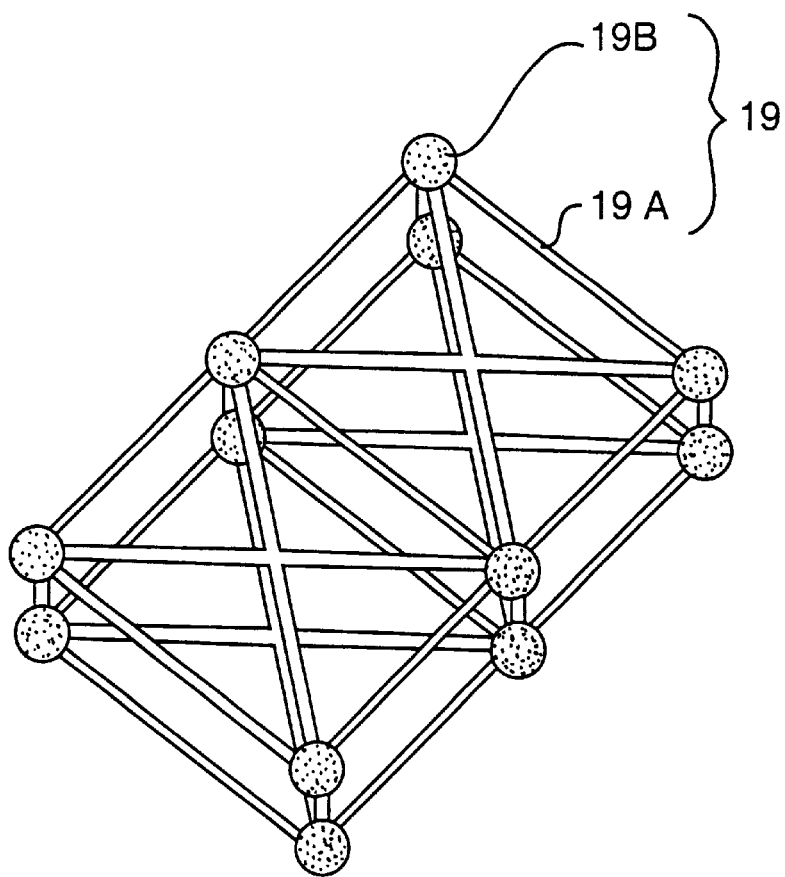
FIG. 5
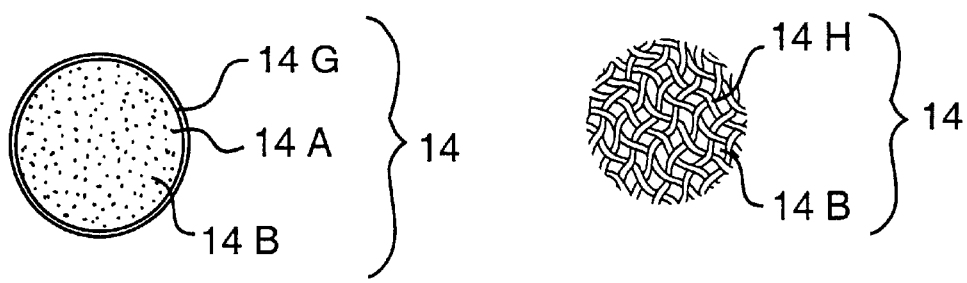
FIG. 6  FIG. 7

REFERENCE TABLE OF SHOCK ACCELERATION

| SHOCK ACCELERATION (G) | FRONT SIDE A VIEW | | BOTTOM SIDE B VIEW | | SIDE SIDE C VIEW | |
|---|---|---|---|---|---|---|
| | SAMPLE 1 | SAMPLE 2 | SAMPLE 1 | SAMPLE 2 | SAMPLE 1 | SAMPLE 2 |
| 0 (BEFORE DEFORMATION) | | | | | | |
| 1000 | | | | | | |
| 2000 | | | | | | |
| 3000 | | | | | | |

INFORMATION STORAGE AND RETRIEVAL DEVICE

FIELD OF THE INVENTION

The present invention relates to an information storage and retrieval device which prevents damage to the mechanism inside the device when the device is exposed to some type of shock. More particularly, this invention is applied to small magnetic disk drives such as 2.5 inch, 1.8 inch, 1.3 inch, or other disk drives yet to be developed.

BACKGROUND OF THE INVENTION

A small magnetic disk drive of the prior art is described in unexamined Japanese patent publication 6-96532. According to this publication, stacked recording disks are rotated with a constant velocity by a disk rotating motor which is fixed to a base. Heads are supported by supporting springs to a carriage, and float on the disks with a minute gap, and record and reproduce information. A voice coil motor rotatively drives the carriage and precisely positions the heads with high speed. The carriage is supported to a pivot assembly consisting of a sleeve with a shaft and two ball bearings and is fixed to the base, so that the carriage can rotate around the shaft.

The voice coil motor which drives the carriage includes a driving coil, permanent magnet, and yoke. The driving coil is fixed to the carriage and the permanent magnet and yoke (referred to as "magnet yoke assembly") are fixed to the base. The driving coil is placed in a magnetic field and magnetically affected so that with an electric current flowing through the driving coil drives the carriage to position the heads as desired.

Recently, such devices are becoming smaller and thinner and the market for removable and portable pocket-sized devices like IC cards is growing. Therefore, a durable device is required to bear the shock and prevent any damage from occurring to the device even when it is bumped or dropped to the floor. There are two ways to improve the durability. One is to improve the durability of each individual element inside the device such as positioning mechanism, disks, and slider, etc. Another way is to protect the whole device from shock.

An example of protecting the whole device from shock is disclosed in unexamined Japanese patent publication 1-311495. In this example, vibration and shock-absorbing materials are arranged on all four sides of the device and the device body is mounted to the inner case by the vibration and shock-absorbing materials. The inner case is provided with projected guides and is removably stored in a case having a guide rail. This way, the vibration and shock transmitted to the device body is reduced.

Another example is disclosed in unexamined Japanese patent publication 4-368690. In this example, chloroprene rubber shock-absorbing materials are arranged at the four corners of the magnetic disk drive housing, thereby protecting the inner mechanism of the device from damage.

SUMMARY OF THE INVENTION

Rubber shock-absorbing materials are utilized in the above described examples to prevent damage to the mechanism in the housing. However, when a device is dropped to the floor by mistake, the shock to the device is enormous and arranging rubber shock-absorbing material at a part of the device as disclosed above may not be sufficient to absorb the shock.

Additionally, the relation of the dimensions of the device and the combined device are not adequately taken into consideration. Therefore, when the conventional method is applied to a removable device, for example a card type, etc., there may be a size problem in that the combined device cannot be mounted in a standard bay of an information processing device.

A main purpose of the present invention is to provide an information storage and retrieval device provided with a shock-absorbing mechanism which can absorb shock energy well enough to prevent damage to the mechanism inside the device even when the device is dropped to the floor by mistake. It is also a purpose of the present invention to provide an information storage and retrieval device that is capable of being installed in a standard-sized bay of an information processing device. Preferably, the shock-absorbing material which is composed with a mixture of solid particles and viscous elastic material is arranged at the periphery of the housing. Also, after a shock, the shock-absorbing material will be deformed and may or may not return to its original shape by itself.

Furthermore, the amount of the shock acceleration given to the device is roughly obtained by comparing the deformed shape of the shock-absorbing material with a quick comparison table. This table is created by measuring the deformed shape of the shock-absorbing material with respect to different shock acceleration values applied to the device.

The whole device is mounted in a shock-absorbing case, and the thickness of the part of the shock-absorbing case which contacts the side of the device is thicker than the part which contacts the cover and base of the device. The shock-absorbing case is preferably made of shock-absorbing material having a mixture of solid particles and viscous elastic material or rubber or plastics. The surface of the shock-absorbing material may be coated with viscous elastic material which is harder than the viscous elastic material which forms the shock-absorbing material. Spring or fiber-net material may used as a mixture with the viscous elastic material to form the shock-absorbing material instead of solid particles.

The original shape of the shock-absorbing material is easily restored manually after the deformation, and the shock-absorbing material can be used repeatedly.

The shock-absorbing material is arranged to be within the form factor dimension of small magnetic disk drives.

The shock-absorbing case in which the device is mounted and or shock-absorbing material may be made from transparent material, so that the information storage and retrieval device can be seen from outside.

In order to achieve the above described purposes of the present invention, as well as others not specifically mentioned, the present invention provides a combined information storage and retrieval device having an information storage and retrieval device, which has a nearly rectangular shape, and which conforms to one specific standard among a series of standards for the dimensions of magnetic disk drives. A shock-absorbing material is provided enclosing the outside of the device along with some means to connect the shock-absorbing material with the device. The combined information storage and retrieval device conforms to a dimensional standard one or two standard sizes larger than that of device alone.

To conform with the requirements of the dimensional standard of the larger combined device, an input-output connector of the prescribed type is provided at the prescribed location and is connected to the input-output connector of the smaller device inside. This way, the combined device is used as an information storage and retrieval device of a larger dimensional standard.

Preferably, the height of the shock-absorbing material is arranged to be nearly the same as the height of the device. The shock-absorbing material is separated into two parts, an upper part and lower part, and a plurality of projections are formed on the facing surfaces of the two parts. The two parts are frame-shaped and are engaged with each other with the projections and form a united shock-absorbing component. The connecting means is preferably composed of adhesive layers on both the top and the bottom of the combination of the device and the shock-absorbing material, and metal plates which are attached to the combination to form the combined device. The metal plates are preferably provided with small holes to radiate heat from the device. The width and length of the metal plates are arranged to be larger than those of the device and smaller than those of the shock-absorbing material.

These and other objects, features and advantages of the present invention will become more apparent in view of the following detailed description of the present invention in conjunction with the drawings.

BRIEF DESCRIPTION OF THE DRAWINGS

FIG. 5 shows another embodiment of the shock-absorbing mechanism of the present invention.

FIG. 6 shows another embodiment of the inner structure of the shock-absorbing material of the present invention.

FIG. 7 shows another embodiment of the inner structure of the shock-absorbing material of the present invention.

DETAILED DESCRIPTION OF THE PREFERRED EMBODIMENTS

The preferred embodiment of the present invention will now be described in conjunction with the drawings.

Figure 1A:
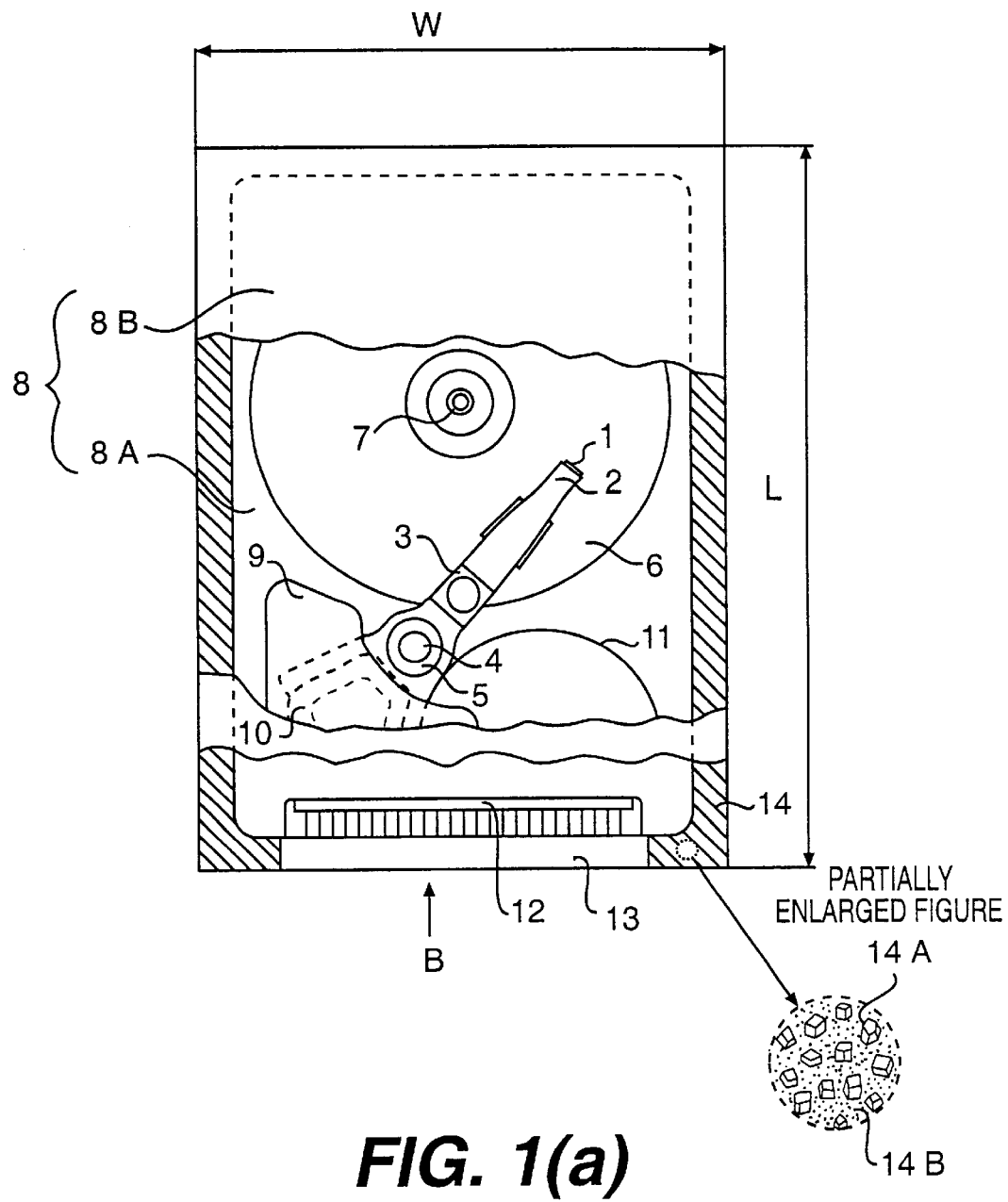
FIGS. 1(a) and 1(b) illustrate a general configuration of an information storage and retrieval device of an embodiment of the present invention.
Figure 1B:
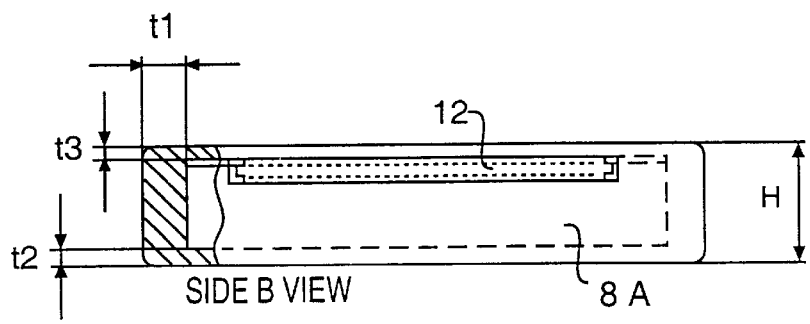

A general configuration of an embodiment of an information storage and retrieval device (magnetic disk device) of the present invention is disclosed referring to FIG. 1. FIG. 1(a) shows the configuration of the magnetic disk device as seen from above, and FIG. 1(b) shows the configuration of the magnetic disk device as seen from the arrow labeled B.

The device cover and a portion near the connector have been removed in these Figures. Disks 6 which are stacked in the vertical direction are rotated by rotation drive motor 7 fixed to the base 8A. Head 1 which records and reproduces information and is fixed to carriage 3 by head supporting spring 2. A pivot assembly provided with two ball bearings between pivot shaft 4 and a sleeve (not shown) is fixed to carriage 3. By fixing the pivot shaft 4 to base 8A, the carriage 3 is rotatively supported around the carriage shaft 4. Carriage 3 is rotatively driven by an actuator which is a magnet-yoke assembly having a yoke and a magnet, and driving coil 10 which is attached to the carriage, so that head 1 is positioned to the desired track of disk 6 to perform information recording and reproducing.

This device is small, slim, removable, and portable, so that it is easy to install and remove from a personal computer. In order to avoid damage to the inner mechanism, shock-absorbing material 14 is arranged around the periphery of the device. The shock-absorbing material 14 is made from a mixture of solid particles 14A and viscous elastic material 14B. The volume ratio of solid particles 14A and viscous elastic material 14B may be 4 to 1, for example. Preferably, the solid particles 14A are silicon sand, nominal 297, with grain size 63.1 (Japan Casting Association Standard), for example. When the shock-absorbing material is exposed to shock, it is greatly deformed and dissipates the shock energy by inner friction, thereby preventing damage to the inner mechanism of the device.

The thicknesses t1, t2 and t3 of the shock-absorbing material 14 that encircles the device is preferably as follows. The thickness of t1, which contacts the side of the device, is thicker than the thickness of t2 and t3, which contact the base and cover of the device, respectively. This way, the volume of shock-absorbing material projecting from the corners of the device is of a predetermined quantity so as to be able to deform the shock-absorbing material 14 effectively when a shock is applied to the device. As a result, the inner mechanism of the device is protected from damage by the dissipation of shock energy due to inner friction.

This device is provided with a connector 12 which connects the device to a personal computer. Connector insertion opening 13 is a inserting space for the connector. Some portion of the shock-absorbing material is removed for this opening. The relationship of the dimensions between the combined device and device 101 is described hereafter. In the magnetic disk drive industry, a standard known as "form factor" is established to specify the dimensional requirement of the device (length L, width W, and height H). It is necessary to meet these dimensions to produce a device which conforms to the dimensional standard. In the present embodiment, the combined device including the shock-absorbing material is also arranged to meet the dimensional standard. For example, the dimensions of the standard form factor for 3 inch magnetic disk drives are L=120.0 mm, W=90.0 mm, and H=10.5 mm or 12.5 mm. For 2.5 inch magnetic disk drives, L=100.0 mm, W=70.0 mm, and H=9.5 mm or 12.7 mm. For 1.8 inch magnetic disk drive, L=85.6 mm, W=54.0 mm, and H=5.0 mm or 10.5 mm.

Figure 2:
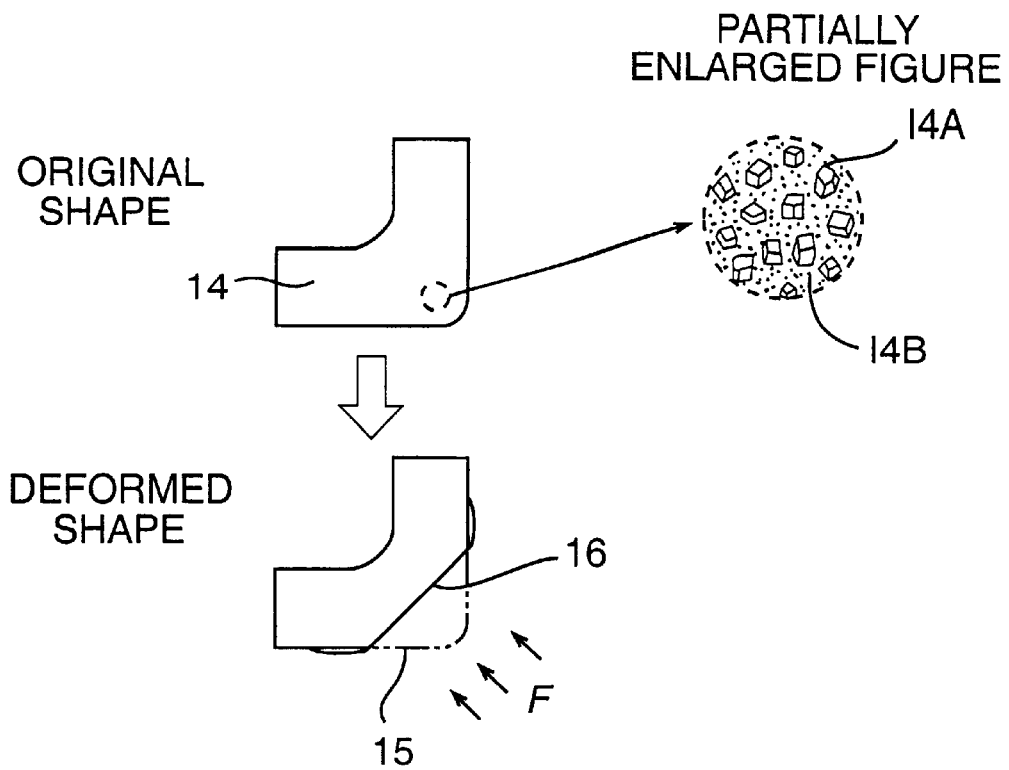
FIG. 2 shows the inner structure and a deformed shape of the shock-absorbing material of the present invention.

The inner structure and the deformed state of the shock absorbing material is shown in FIG. 2. FIG. 2 is an enlarged drawing of a part of the corner of the shock-absorbing material 14. When a shock is applied to the shock absorbing material, it is deformed greatly as shown by numeral 16, for example. Through the process of deformation, the solid particles 14A and the viscous elastic material 14B scrape against each other, and the shock energy changes to frictional heat and dissipates. Consequently the inner mechanism of the device is protected from damage.

After the shock, according to one embodiment, the shock-absorbing material is greatly deformed and does not return to its original shape when left untouched. This is needed to perform the shock energy dissipation to its greatest extent. In case the shock-absorbing material is deformed after the device is bumped against something or dropped to the floor, a user can restore it to its original shape by hand in preparation for the next shock and deformation. Additionally, the shock-absorbing material may be made from an elastic material so that it gradually returns to its original shape after the shock and deformation.

Figure 3:
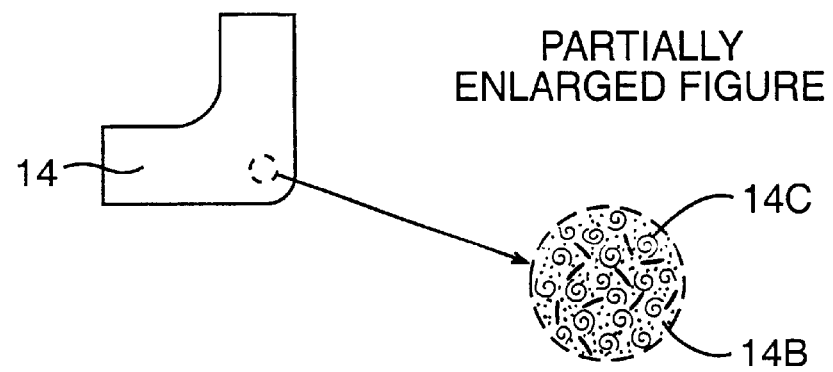
FIG. 3 shows another embodiment of the inner structure of the shock-absorbing material of the present invention.

Another embodiment of the inner structure of the shock-absorbing material is shown in FIG. 3. FIG. 3 includes a partially enlarged view of a material that forms the shock-absorbing material 14. The shock-absorbing material 14 may be made from a mixture of spring material 14C and viscous elastic material 14B. Spring material 14C is made from some type of elastic material such as metal, plastic or ceramic. The spring material 14C and viscous elastic material 14B are mixed together in a four to one ratio, for example. The shock-absorbing material 14 is deformed greatly after the shock and through the process of deformation, spring 14C and viscous elastic material 14B scrape with each other, thereby converting the shock energy to friction heat which dissipates. Consequently the inner mechanism of the device is protected from damage.

Figure 4:
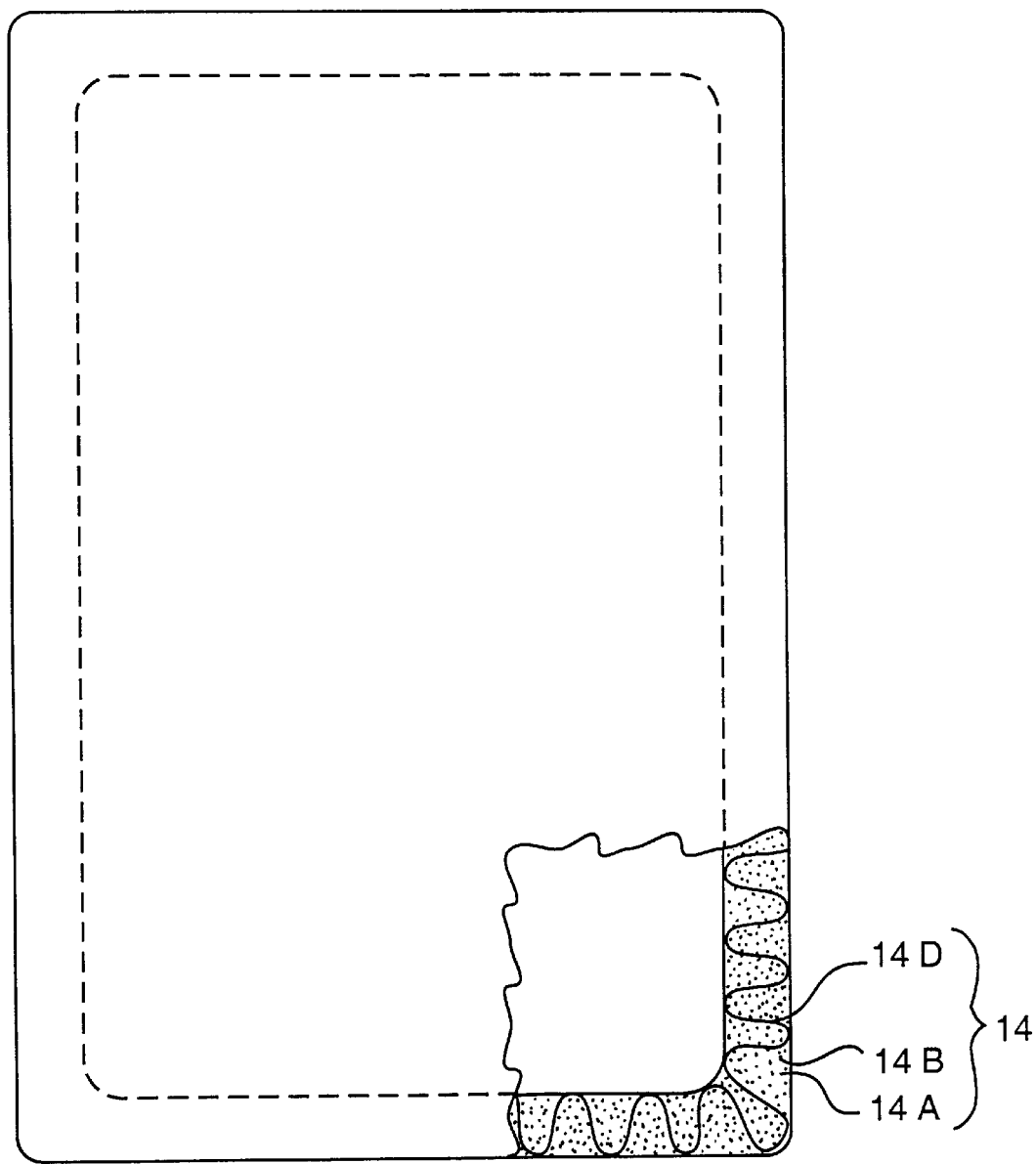
FIG. 4 shows another embodiment of the inner structure of the shock-absorbing material of the present invention.

Another embodiment of the inner structure of the shock-absorbing material is shown in FIG. 4. The shock-absorbing material 14 is formed by filling a mixture of the solid particles 14A and viscous elastic material 14B around a spring 14D. The spring 14D can be made from metal or plastic, or the like. Just as before, the shock-absorbing material 14 is greatly deformed from a shock and through the process of deformation, the spring 14C and the viscous elastic material 14B scrape against each other to convert shock energy to friction heat which dissipates. As a result, the inner mechanism of the device is protected from damage. Additionally, the amount of friction can be increased by roughing the surface of the spring 14C. In this embodiment, there is no need for a user to restore the shape of the shock absorbing material since it gradually returns to its original shape after the shock due to the elastic nature of spring 14C.

Another embodiment of the shock-absorbing material according to the present invention is shown in FIG. 5. FIG. 5 shows a shock-absorbing mechanism 19 which stores a magnetic disk device. The device is stored in a woven-basket type shock-absorbing case 19A formed from rubber or plastics. A shock-absorbing material 19B, which is a mixture of solid particles and viscous elastic material, is arranged at the corners of the shock-absorbing case 19A. Shock-absorbing material 19B is made from a similar material as that used in the previously described embodiments. The shape of shock-absorbing material 19B may be spherical, for example. Shock-absorbing material 19B is deformed as a result of a shock, and through the process of deformation, the solid particles and the viscous elastic material scrape against each other to convert the shock energy to friction heat which dissipates. As a result, the inner mechanism of the device is protected from damage. Additionally, in this embodiment, the shock-absorbing case may be a honeycomb type instead of woven net type.

When shock-absorbing case 19A and shock-absorbing material 19B are made from transparent material, the device inside the case can be seen from the outside. When the magnetic disk device is used as a desktop external storage device, this design can look quite impressive.

Another embodiment of the structure of the shock-absorbing material is shown in FIG. 6. Shock-absorbing material 14 is made from a mixture of solid particles 14A and viscous elastic material 14B as in the above-mentioned embodiments. Additionally, the surface of the shock-absorbing material has a coated layer 14G of viscous elastic material which is harder than viscous elastic material 14B. By selecting the characteristics such as the hardness of the viscous elastic material 14B within the shock-absorbing material and also the thickness and the hardness of coated layer 14G, various shock absorbing characteristics can be realized.

Another embodiment of the structure of the shock-absorbing material is shown in FIG. 7. FIG. 7 is an enlarged view of a part of the inner structure of a shock-absorbing material 14 which is formed from a mixture of fiber-net material 14H and viscous elastic material 14B. By selecting the material of the fiber-net material 14H and the structure of the cloth and the viscous elastic material 14B, various shock-absorbing characteristics are available.

Figure 8:
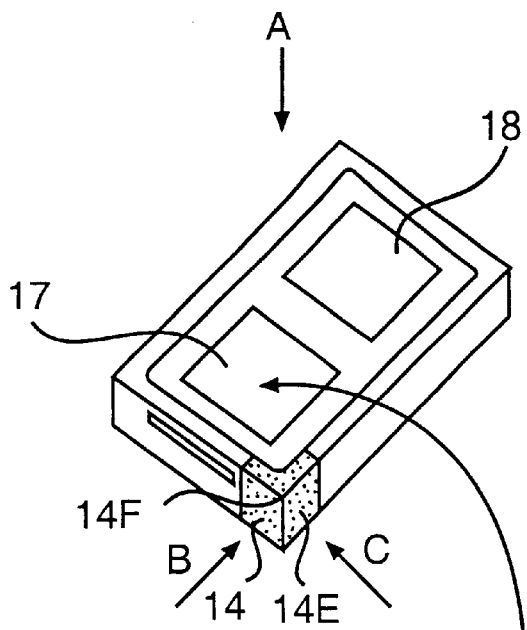
FIG. 8 shows a quick reference table of the shock acceleration of the shock-absorbing mechanism of the present invention.

Next, a method for roughly determining the shock acceleration applied to a device when it is bumped or dropped to the floor by mistake will be described in conjunction with FIG. 8. FIG. 8 is a quick reference table of shock acceleration of the shock-absorbing mechanism. The amount of shock acceleration with respect to the degree of deformation is previously measured by experimentation. Quick reference table 17 is prepared from the results of the experimentation, and the table is affixed to the surface of the device. In this embodiment two samples (sample 1 and sample 2) are shown and the direction of the shock is different for each. For each sample the original shape of the shock-absorbing material 14 and the deformed shape after the shock acceleration of 1000 G, 2000 G, and 3000 G are shown. Sample 1 is a case where the shock is provided to end 14E of the shock-absorbing material. Sample 2 is a case where the shock is given to the corner 14F of the shock-absorbing material. By comparing the deformed shape of the shock-absorbing material with the comparison table, the shock acceleration applied to the device is roughly obtained. This table is also useful in notifying the user to be careful in handling the device. Also, it is convenient if a data label 18 is affixed to the top of the device.

Figure 9:
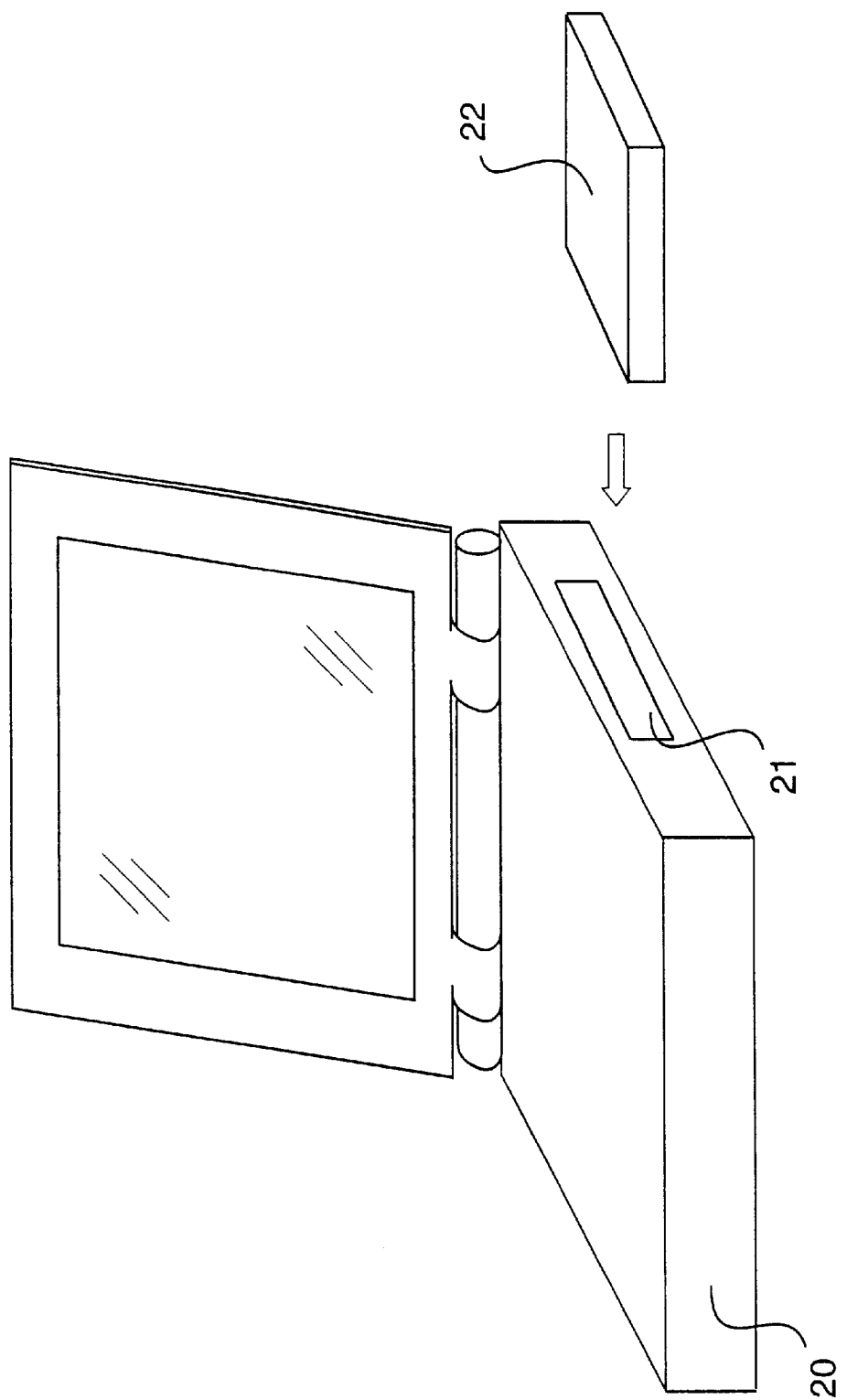
FIG. 9 shows a means to store the information storage and retrieval device of the present invention.
Figure 10:
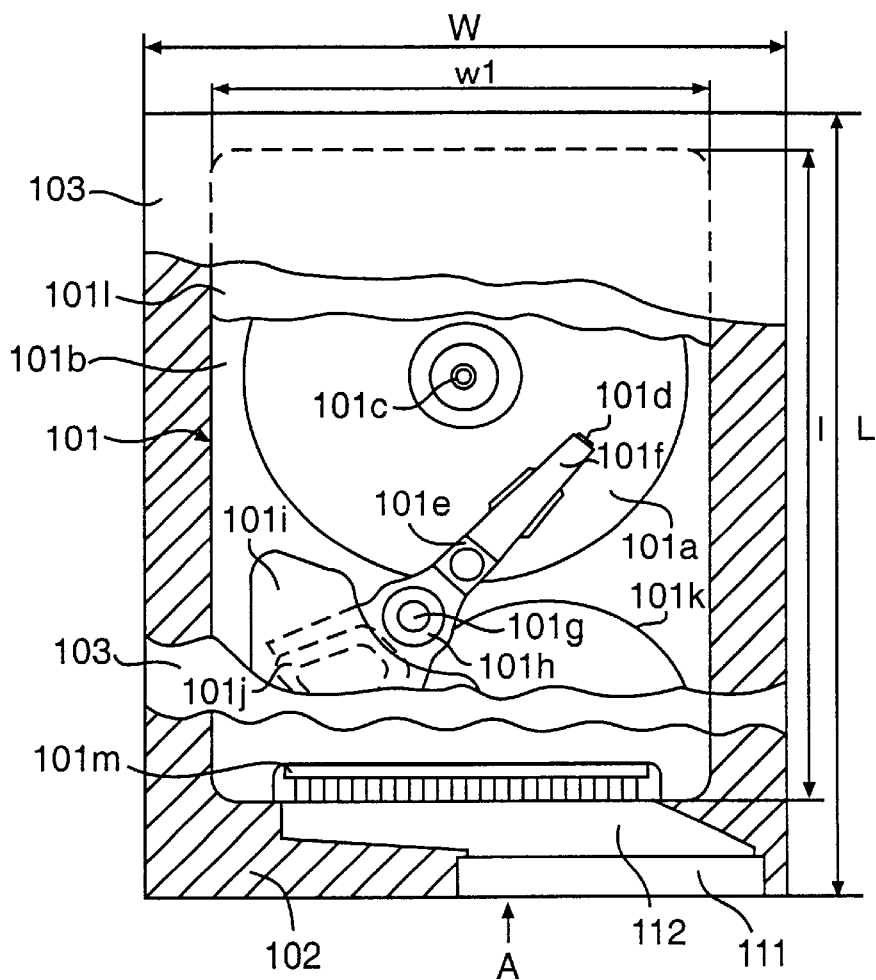
FIGS. 10(a) and 10(b) illustrate a general configuration of a device according to another embodiment of the present invention shown with a part sectioned.
Figure 10:
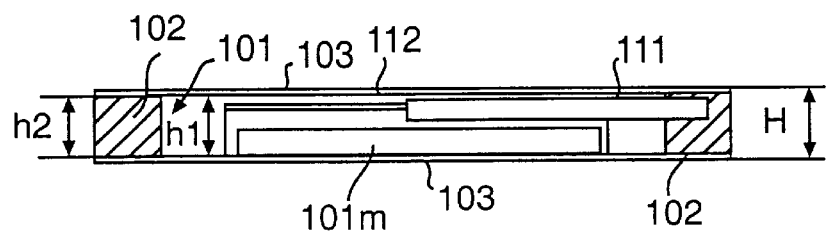
Figure 11:
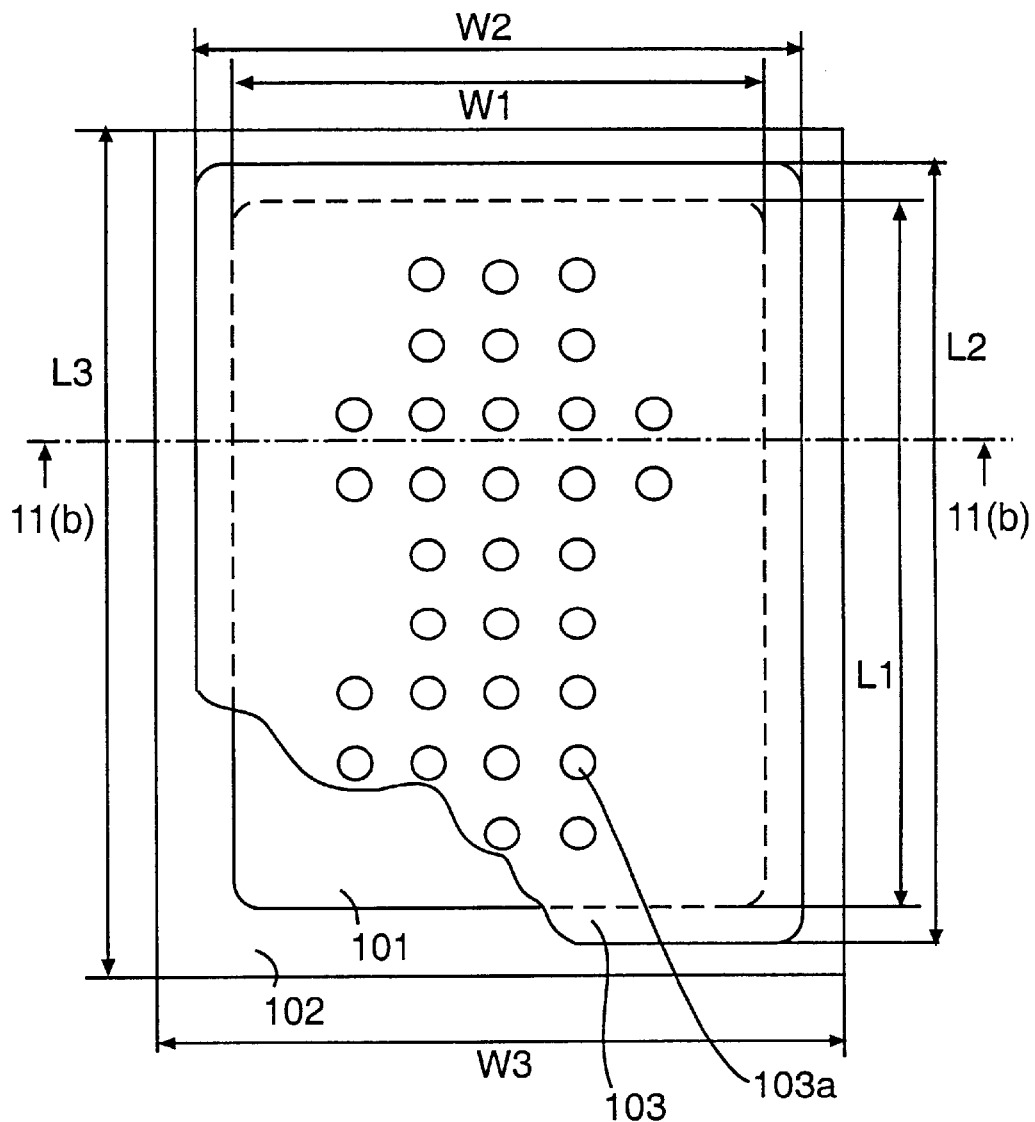
FIGS. 11(a) and 11(b) illustrate another embodiment of the device-supporting material shown in FIGS. 10(a) and 10(b).
Figure 11:
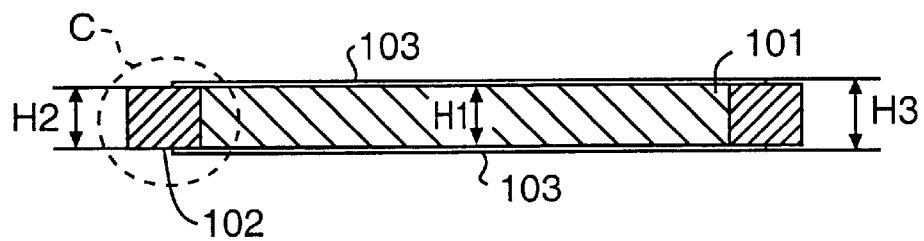

A method of connecting an information storage and retrieval device with a computer according to the present invention is shown in FIG. 9. For example, magnetic disk device 22, which is provided with a shock-absorbing mechanism, is mounted in a personal computer 20 via opening 21. A user can mount and dismount magnetic disk device 22 easily using a connector (not shown), thereby making it possible to carry the magnetic disk device. Furthermore, as previously described, the magnetic disk device can be used as an external storage device connected with a personal computer by a cable (not shown) and placed on a desk. In this case, for aesthetic purposes, the device can be formed in various colors and shapes.

Now, additional embodiments of the present invention will be described in conjunction with FIGS. 10(a)–18(b).

A general configuration of an information storage and retrieval device of another embodiment of the present invention, where the device is a small, thin, portable, and removable magnetic disk device, is shown in FIGS. 10(a) and 10(b). FIG. 10(a) is a top view of the magnetic disk device, and FIG. 10(b) is a front view of the magnetic disk device. In both figures, a portion of the device has been removed for purposes of explanation. The magnetic disk drive shown in FIGS. 10(a) and 10(b) can easily be mounted to and dismounted from an information processing device. When it is mounted, information is recorded and retrieved by the information processing device. In these figures, 101 is a basic magnetic disk drive which conforms to one specific standard among a series of dimensional standards of magnetic disk drives. As mentioned before, the dimensional standard generally used in the magnetic disk drive industry is called "form factor".

The operation of the device of FIGS. 10(a) and 10(b) is similar to that of FIGS. 1(a) and 1(b). However, the explanation will be repeated for the sake of convenience. Disk 101a is rotated by disk driving motor 101c fixed to base 101b. Head 101d, which records and reproduces information, is fixed to carriage 101c by supporting spring 101f. A pivot assembly provided with two ball bearings between carriage pivot shaft 101g and a sleeve (not shown) is fixed to carriage 101e. By fixing the carriage pivot shaft 101g to base 101b, carriage 101e is rotatively supported around carriage pivot shaft 101g. Carriage 103 is rotatively driven by an actuator which consists of magnet-yoke assembly 101i having yokes and magnets, and driving coil 101j which is attached to the carriage 101e, so that head 101d is positioned to the desired track of disk 101a and information recording and reproducing is performed. The symbol 101k is an FPC (Flexible Printed Circuit) and 101l is a cover.

To prevent damage to the inner mechanism of device 101, a shock-absorbing material 102 is arranged so that it encloses the sides of device 101. The shock-absorbing material 102 is composed of mainly viscous-elastic material, such as butylene rubber or gel-state viscous-elastic material, etc. When the device is exposed to shock, shock-absorbing material 102 is greatly deformed, and the shock-energy is dissipated due to inner friction, so that the damage to the inner mechanism of the device is prevented.

Height h2 of shock-absorbing material 102 is preferably nearly the same as height h1 of the side portion of device 101. Consequently, the height of the device will be as small as possible. The shock-absorbing material 102 and device 101 are combined into one unit with device-supporting material 103. The sides of device 101 are placed into close contact with shock-absorbing material 102 by device-supporting material 103, and device 101 and shock-absorbing material 102 are combined to one unit. In this embodiment, device-supporting material 103 is composed of a pair of plates. These plates are attached to the top and the bottom of the combination of device 101 and shock-absorbing material 102, thereby combining the device 101 and shock-absorbing material 102 into one unit.

The device of the present invention includes a magnetic disk drive which conforms to one of the series of form factor standards, such as 3 inch, 2.5 inch, and 1.8 inch, etc., shock-absorbing material 102, and a connecting means which is device supporting-material 103, for example. As a result, the external dimensions of the overall device are arranged to conform with the form factor standard one or two standard sizes larger than that of device 101. For example, the external dimensions of the combined device which utilizes 1.8 inch magnetic disk drive is arranged to meet with 2.5 inch form factor standard. For another example, the 3 inch form factor standard is adopted for the combined device with a 2.5 inch magnetic disk drive inside. The device in the present invention is provided with connector 111 to connect with an information processing device, here for example a personal computer.

Thus, the combined device which utilizes a 1.8 inch magnetic disk drive as device 101 is provided with a connector 111 which is used for 2.5 inch magnetic disk drives. When device 101 is a 2.5 inch magnetic disk drive, the combined device is provided with a connector which is used for 3 inch magnetic disk drives. Cable assembly 112, which is composed of a Flexible Printed Circuit and supporting material, is provided to connect connector 101m of device 101 and connector 111 for connecting with an information processing device. Also, cable assembly 112 supports and positions connector 101m and connector 111. Connector 111 is located at the same position as the magnetic disk drive of the same form factor standard as the combined device in the present invention, here for example 2.5 inch or 3 inch magnetic disk drives. As a result, the device in the present invention can be used as a magnetic disk drive which conforms to the form factor standard.

Another example of the device-supporting material 103 is shown in FIGS. 11(a) and 11(b). FIG. 11(a) is a top partial cutaway view and FIG. 11(b) is a cross-sectional view along the line 11(b)—11(b) in FIG. 11(a). The connector portion is omitted in both views.

In FIGS. 11(a) and 11(b), device-supporting material 103 is formed from a thin metal plate, for example a thin stainless steel plate, and a double-sided adhesive tape which is attached to the metal plate. By attaching device-supporting material 103 on both the top and the bottom of the combination of device 101 and shock-absorbing material 102, device 101 and shock-absorbing material 102 are combined into one unit. Holes 103a are provided on the device-supporting material 103 to radiate the heat from device 101. The stainless steel plate positions and supports device 101 and shock-absorbing material and also reinforces the combination. The double-sided adhesive tape is attached to the stainless steel over its whole area or the area where it faces both device 101 and shock-absorbing material 102.

Length L2 of device-supporting material 103 (i.e. here the layer of stainless steel plate and double-sided adhesive tape) is arranged to be larger than length L1 of device 101 and smaller than length L3 of the combined device. Similarly, width W2 of device-supporting material 103 is arranged to be larger than width W1 of device 1 and smaller than width W3 of the combined device. By arranging the dimensions in this manner, device 101 is prevented from dropping out of shock absorbing-material 102, and the outer part of shock-absorbing material is easily deformed by a shock and the shock energy is sufficiently dissipated due to inner friction, so that device 101 is effectively prevented from being damaged.

Height H2 of shock-absorbing material 102 which encloses device 101 is preferably the same as height H1 of device 101. By arranging the dimensions as above, the height of the combined device will be as small as possible, and the shock-absorbing material is arranged to be at the sides and corners of the device so that shock-absorbing material 102 will be effectively deformed when subjected to some shock.

Consequently by dissipating the shock energy due to inner friction, damage to the mechanism inside the device is prevented.

Figure 12:
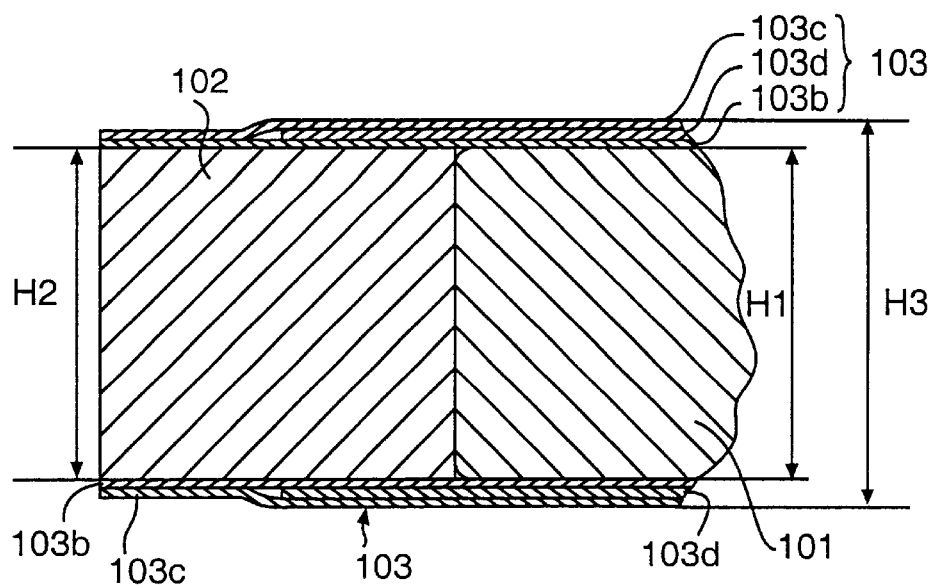
FIG. 12 shows another embodiment of the device supporting-material shown in FIGS. 10(a) and 10(b).

Another example of the device supporting material 103 is described in FIG. 12. This is an enlarged cross-sectional view of part C in FIG. 11. In this example, device-supporting material 103 is composed of double-sided adhesive tape 103*b*, single-sided adhesive tape 103*c*, and metal plate 103*d*. Metal plate 103*d* is sandwiched between single-sided adhesive tape 103*c* and double-sided adhesive tape 103*b*. The other side of double-sided adhesive tape 103*b* is attached to the top of the combined device. Similarly, metal plate 103*d* is sandwiched between single-sided adhesive tape 103*c* and double-sided adhesive tape 103*b*. The other side of double-sided adhesive tape 103*b* is attached to the bottom of the combined device. By attaching device-supporting material 103 to the top and the bottom of the combined device, device 101 and shock-absorbing material 102 are fixed to become one unit. Furthermore, height H2 of shock-absorbing material 102 is preferably nearly the same as height H1 of device 101, as in the embodiment shown in FIG. 10(*b*).

Figure 13:
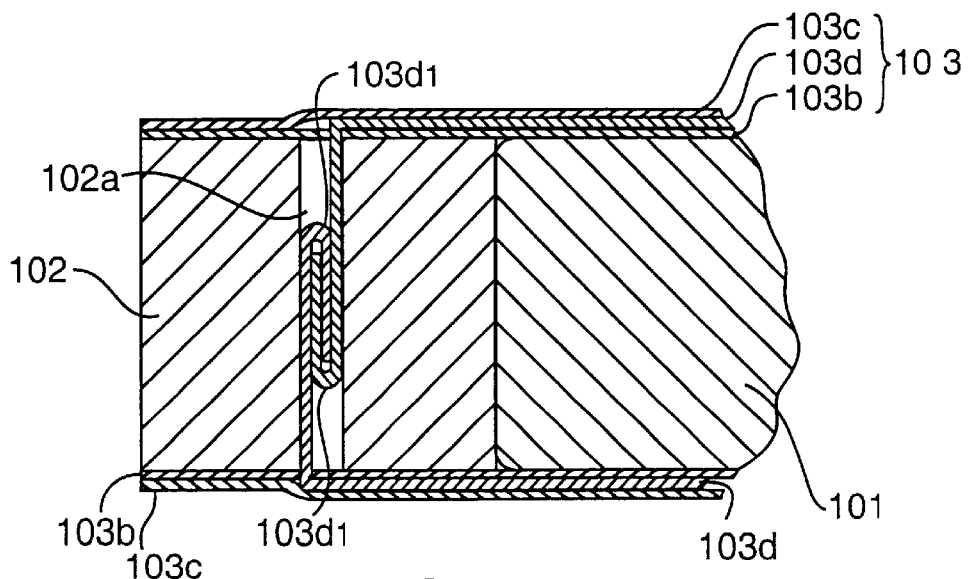
FIG. 13 shows a variation of the embodiment of the device-supporting material shown in FIG. 12.

Metal plates 103*d* which form the device-supporting material 103 at the top and the bottom of device 101 and shock-absorbing material 102 may be arranged to engage each other to assemble the combined device as shown in FIG. 13. In the example shown in FIG. 13, slit 102*a* is arranged in shock-absorbing material 102, and the ends 103*d*1 of metal plates 103*d* are bent and folded, and the folded engagement parts 103*d*1 are provided and inserted into the slit 102*a* from the top and the bottom of shock-absorbing material 102 and are engaged with each other to combine and reinforce the combined device. This way, device 101 and shock-absorbing material 102 are easily combined and reinforced. Also, through holes may be arranged in shock-absorbing material 102 and metal plates 103*d* may be fixed with screws through the holes.

Figure 14:
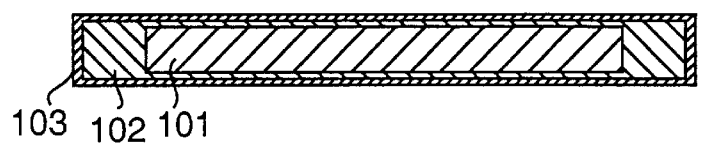
FIG. 14 shows another embodiment of the device-supporting material shown in FIGS. 10(a) and 10(b).

A cross-sectional view of the fourth embodiment of device-supporting material 103 is shown in FIG. 14. In this example, device-supporting material 103 forms a case in which the combined device including device 101 and shock-absorbing material 102 are contained. Shock-absorbing material 102 is injected into the space between device 101 and device-supporting material 103. Device 101 does not touch device-supporting material 103 and is supported and protected against shock by shock-absorbing material 102. As a result, a shock to device-supporting material 103 is not directly transmitted to device 101 and damage to the inner mechanism of device 101 is prevented.

Figure 15:
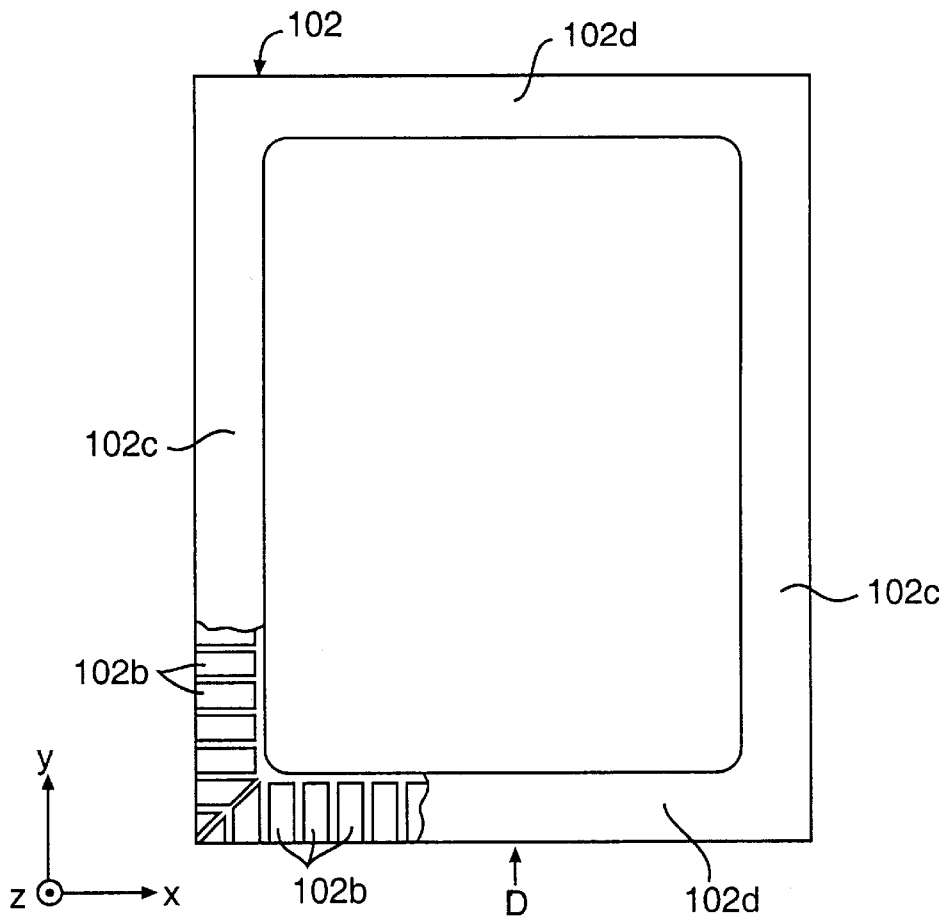
FIGS. 15(a) and 15(b) illustrate another embodiment of the shock-absorbing material shown in FIGS. 10(a) and 10(b).
Figure 15:
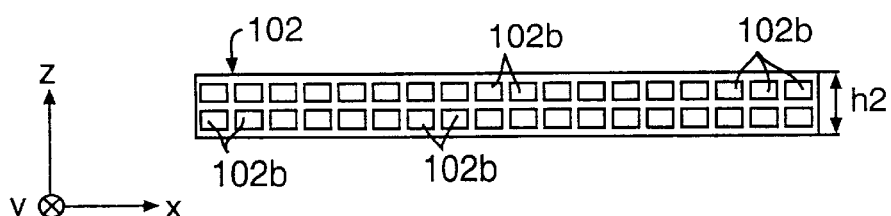

Another embodiment of the shock-absorbing material 102 is shown in FIGS. 15(*a*) and 15(*b*). The top view with one part sectioned is shown in FIG. 15(*a*) and the front view is shown in FIG. 15(*b*). Shock-absorbing material 102 is formed mainly from viscous-elastic material, such as butylene rubber or gel-state viscous-elastic material, etc. Inside shock-absorbing material 102, a plurality of pits 102*b* are formed, and shock-absorbing material 102 is relatively flexible as compared with the version previously disclosed. Consequently, when exposed to shock, it is greatly deformed and the shock energy is dissipated well due to inner friction, so that damage to the inner mechanism of the device is prevented.

At the side portion 102*c* of shock-absorbing material 102, the pits 102*b* are formed along the direction normal to the y-z plane, and at the front and the end part 102*d* of shock-absorbing material 102, pits 102*b* are formed along the direction normal to the x-z plane. The cross-sectional shape of pits 102*b* (shown in FIG. 15(*b*)) is rectangular, however, the may alternatively be the shape of a square, ellipse, circle, etc. Additionally, pits 102*b* may be formed along the direction normal to x-y plane.

Figure 16:
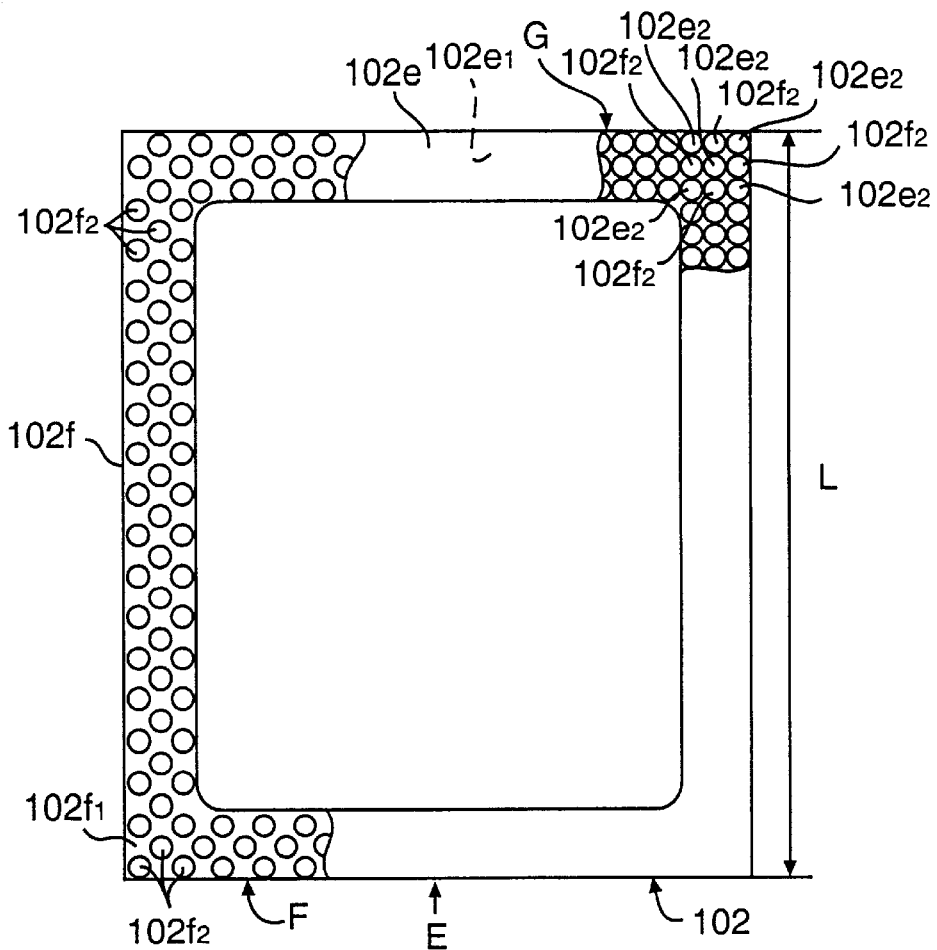
FIGS. 16(a) and 16(b) illustrate another embodiment of the shock-absorbing material shown in FIGS. 10(a) and 10(b).
Figure 16:
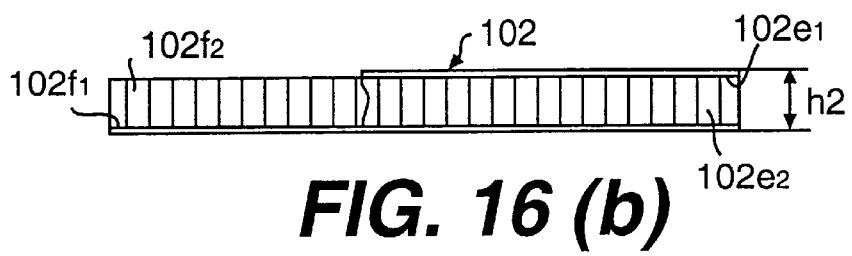

Another embodiment of a shock-absorbing material is shown in FIGS. 16(*a*) and 16(*b*). The top view is shown with one part sectioned in FIG. 16(*a*) and the front view is shown in FIG. 16(*b*). The purpose of this embodiment is to enhance inner friction when the device is exposed to shock so that the dissipation of shock energy is promoted. In the present embodiment, shock-absorbing material 102 is frame-shaped and separated into two parts, top frame 102*e*1 and bottom frame 102*f*1. A plurality of projections are formed on the surfaces of 102*e*1 and 102*f*1 which face each other, and frames 102*e*1 and 102*f*1 are engaged with each other with these projections and form a united shock-absorbing material.

As shown in sectioned part F in FIG. 16(*a*), projections 102*f*2 are formed on bottom frame 102*f* along the direction normal to base plane 102*f*1. A plurality of projections 102*f*2 are formed at regular intervals. Similarly, projections 102*e*2 are formed on top frame 102*e* along the direction normal to base plane 102*c*1. Similarly, a plurality of projections 102*e*2 are formed at regular intervals. By engaging top and bottom frames 102*e* and 102*f* with each other, each surface of projections 102*e*2 and 102*f*2 engages with the other, as shown in cutaway part G. As a result, when the device is exposed to shock, multiple projections 102*e*2 and 102*f*2 rub against each other, and the shock energy is dissipated into heat, and damage to the mechanism inside the device is prevented.

Furthermore, when an even number of projections 102*e*2 and 102*f*2 are formed for each row along the L direction, top and bottom frames 102*e* and 102*f* can be of the same shape. Consequently, shock-absorbing material 102 is composed of only one shape of frame 102*e* or 102*f*. Top and bottom frames 102*e* and 102*f* are formed with mainly viscous-elastic material, such as butylene rubber or gel-state viscous-elastic material, etc.

Figure 17:
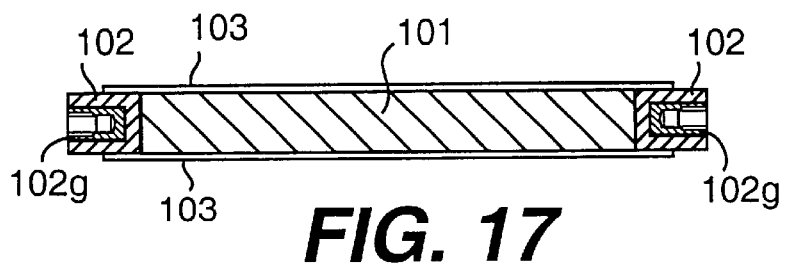
FIG. 17 shows another embodiment of the shock-absorbing material shown in FIGS. 10(a) and 10(b).

Another embodiment of shock-absorbing material 102 is shown in FIG. 17. A cross-sectional view of a portion corresponding to that shown in FIG. 11(*b*) is shown here. In this embodiment, shock-absorbing material 102 is provided with built-in nuts 102*g* opening to the side surface. The combined device can be mounted in a bay (not shown) by using bolts (not shown) and nuts 102*g*.

In previously mentioned embodiments, shock-absorbing material 102 was attached to the side surfaces of device 101. However, shock-absorbing material 102 may be fixed to device 101 using bolts through screw holes (not shown) formed at the side surface of the housing of device 101.

Figure 18A:
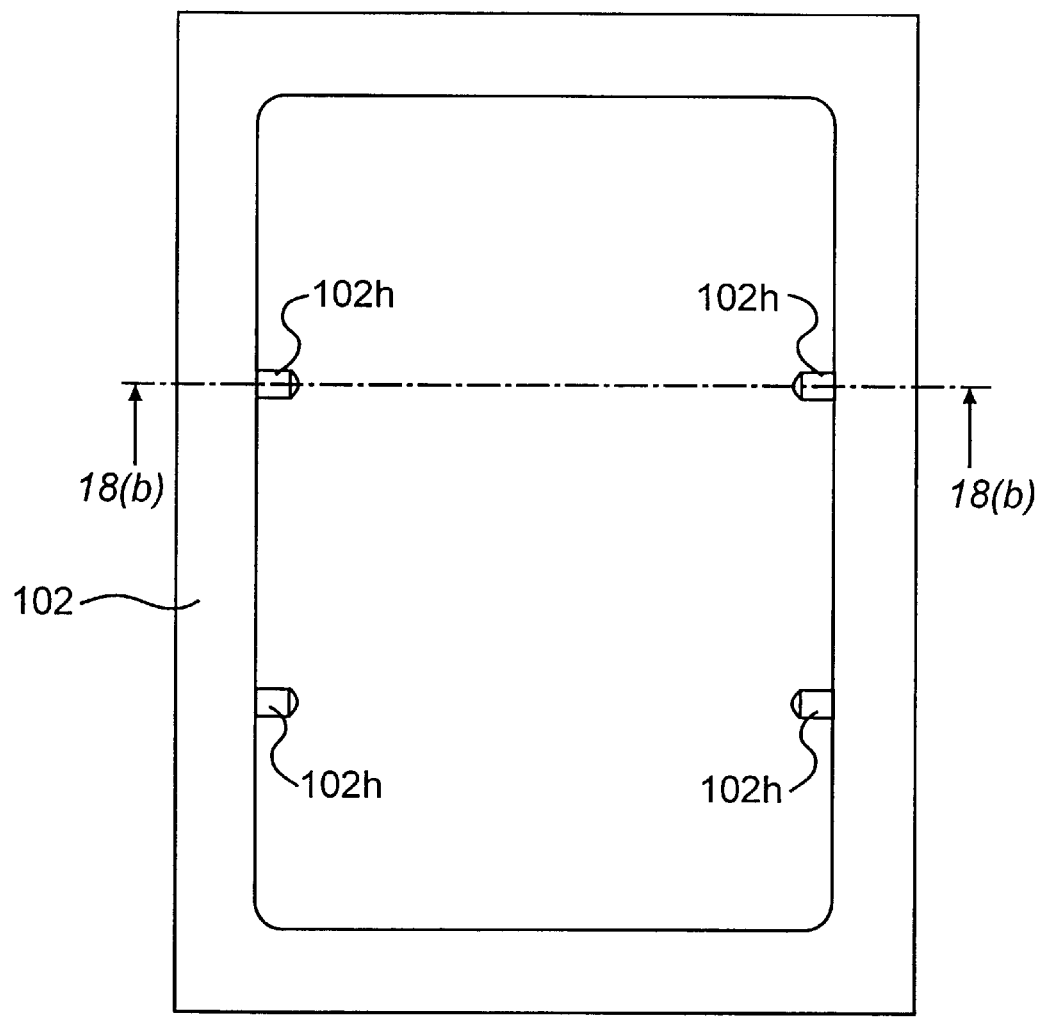
FIGS. 18(a) and 18(b) show another embodiment of the shock-absorbing material shown in FIGS. 10(a) and 10(b).
Figure 18B:
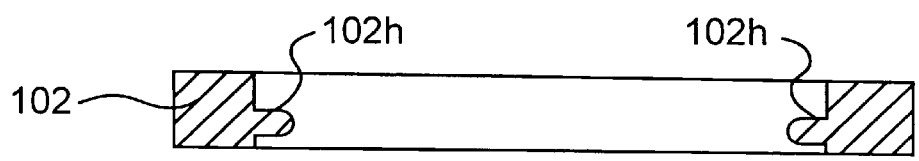

Another embodiment of shock-absorbing material 102 is shown in FIGS. 18(*a*) and 18(*b*). A top view is shown in FIG. 18(*a*), and a cross-sectional view along the line 18(*b*)—18(*b*) is shown in FIG. 18(*b*). In this embodiment, shock-absorbing material 102 is provided with a plurality of connecting projections 102*h* on the inner surface. Shock-absorbing material 102 is easily fixed to device 101 by inserting the connecting projections 102*h* into the mounting screw holes (not shown) in the housing of device 101. The connecting projections 102*h* may be either formed together with shock-absorbing material 102 or may be formed separately.

The information storage and retrieval device of FIGS. 10(a)–18(b) can be mounted to and removed from an information processing device, such as a personal computer, in a manner similar to magnetic disk device 22 of FIG. 9. Accordingly, additional figures have been omitted in order to be concise.

While the present invention has been described above in conjunction with the preferred embodiments, one of ordinary skill in the art would be enabled by this disclosure to make various modifications to the preferred embodiments and still be within the scope and spirit of the present invention as embodied in the appended claims.

What is claimed is:

1. An information storage and retrieval device comprising:
    a disk for storing information;
    a disk driving motor for rotating the disk;
    a carriage which supports a head which records and reproduces information to and from the disk, the carriage rotatively positioning the head along a radial direction of the disk;
    a carriage driving mechanism which applies a rotational torque to the carriage;
    a housing including a base and a cover and containing the disk, disk driving motor, carriage and carriage driving mechanism; and
    shock-absorbing material formed from a mixture of solid particles and viscous elastic material and arranged at a periphery of the housing in order to absorb any shock that is applied to the device, wherein when a shock is applied to the device, the shock-absorbing material is deformed and gradually returns to its original shape.

2. The information storage and retrieval device according to claim 1, wherein the shock-absorbing material is arranged to be within a form factor of a 2.5 inch magnetic disk drive having dimension selected from a group consisting of 100×70×9.5 mm, 100×70×12.7 mm and 100×70×19 mm.

3. An information storage and retrieval device comprising a housing having a base and a cover on both sides of an inner mechanism including a disk that stores information, a disk driving motor that rotates the disk, a carriage that supports a head which records and reproduces information to and from the disk and rotatively positions the head along a radial direction of the disk, and a carriage driving mechanism that applies a rotational torque to the carriage;
    wherein the housing and inner mechanism are mounted in a shock-absorbing case, and a thickness of a portion of the shock-absorbing case which contacts a side of the inner mechanism is thicker than a portion of the shock-absorbing case which contacts the cover and base of the housing wherein in said shock-absorbing case is formed from a shock absorbing material having a mixture of solid particles and viscous elastic material.

4. An information recording and reproducing device comprising:
    a recording and reproducing mechanism; and
    a shock absorbing material formed from a mixture of solid particles and viscous elastic material and arranged at a periphery of the recording and reproducing mechanism,
    wherein the shock absorbing material becomes substantially deformed when the information recording and reproducing device is exposed to an external shock, thereby converting energy from the shock into frictional heat in order to protect the recording and reproducing mechanism from damage.

5. The information recording and reproducing device according to claim 4, wherein after the shock absorbing material is deformed, it does not return to its original shape unless manipulated by a user.

6. The information recording and reproducing device according to claim 4, wherein after the shock absorbing material is deformed, it returns substantially to its original shape without any outside assistance.

7. The information recording and reproducing device according to claim 4, wherein the shock absorbing material includes a mixture of solid particles and a viscous elastic material.

8. The information recording and reproducing device according to claim 7, wherein the solid particles are silicon sand.

9. The information recording and reproducing device according to claim 4, wherein the shock absorbing material includes a mixture of a spring material and a viscous elastic material.

10. The information recording and reproducing device according to claim 9, wherein the spring material is selected from a group consisting of metals, plastics and ceramics.

11. The information recording and reproducing device according to claim 4, wherein the shock absorbing material is formed by providing a mixture of solid particles and a viscous elastic material around a spring, and wherein after the shock absorbing material is deformed, the spring causes the shock absorbing material to return substantially to its original shape before being deformed.

12. The information recording and reproducing device according to claim 4, wherein the shock absorbing material includes a mixture of solid particles and a viscous elastic material, and wherein the shock absorbing material is supported at predetermined locations of a shock absorbing case.

13. The information recording and reproducing device according to claim 4, further comprising a device support which holds the recording and reproducing mechanism in close contact with the shock absorbing material.

14. The information recording and reproducing device according to claim 4, wherein the device conforms to one of a plurality of form factor standards.

* * * * *